(12) United States Patent
Ulrich et al.

(10) Patent No.: US 9,399,261 B2
(45) Date of Patent: Jul. 26, 2016

(54) HYBRID WELDING CONTROL TECHNIQUE

(71) Applicant: Illinois Tool Works Inc., Glenview, IL (US)

(72) Inventors: James F. Ulrich, Appleton, WI (US); Allen Raymond Sykes, New London, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 401 days.

(21) Appl. No.: 13/802,376

(22) Filed: Mar. 13, 2013

(65) Prior Publication Data

US 2014/0263238 A1 Sep. 18, 2014

(51) Int. Cl.
*B23K 9/095* (2006.01)
*B23K 9/10* (2006.01)
*H02J 7/00* (2006.01)

(52) U.S. Cl.
CPC .............. *B23K 9/095* (2013.01); *B23K 9/1012* (2013.01); *B23K 9/1075* (2013.01); *H02J 7/0068* (2013.01)

(58) Field of Classification Search
CPC .......... B23K 9/10; B23K 9/1006; B23K 9/32; B23K 9/095; B23K 9/1012; B23K 9/1075
USPC .................................. 219/130.1, 133, 137 PS
See application file for complete search history.

(56) References Cited

U.S. PATENT DOCUMENTS

| 5,250,786 | A | 10/1993 | Kikuchi | |
|---|---|---|---|---|
| 6,175,217 | B1 | 1/2001 | Da Ponte | |
| 2006/0027548 | A1* | 2/2006 | Albrecht | B23K 9/1006 219/133 |
| 2006/0037953 | A1* | 2/2006 | Matthews et al. | 219/133 |
| 2008/0314885 | A1* | 12/2008 | Hutchison | 219/133 |
| 2010/0194356 | A1* | 8/2010 | Fosbinder et al. | 322/25 |
| 2011/0114607 | A1* | 5/2011 | Albrecht | B23K 9/1006 219/108 |

FOREIGN PATENT DOCUMENTS

| WO | 2007106654 | 9/2007 |
|---|---|---|
| WO | 2011091312 | 7/2011 |

OTHER PUBLICATIONS

International Search Report from PCT application No. PCT/US2014/017475, dated Jul. 29, 2014, 10 pgs.

* cited by examiner

*Primary Examiner* — Brian Jennison
(74) *Attorney, Agent, or Firm* — Fletcher Yoder P.C.

(57) ABSTRACT

A hybrid welding system is provided. In one embodiment, the welding system includes an engine-driven generator, an energy storage device, a contactor, and a controller. The controller may be configured to control delivery of weld power from the generator when a commanded output is below a threshold level, and from both the generator and the energy storage when the commanded output is above the threshold level. Closing of the contactor enables the energy storage device to contribute to weld power during welding operations and to be charged by the generator output independent of charging between weld operations. Additional hybrid welding systems and methods are also disclosed.

20 Claims, 5 Drawing Sheets

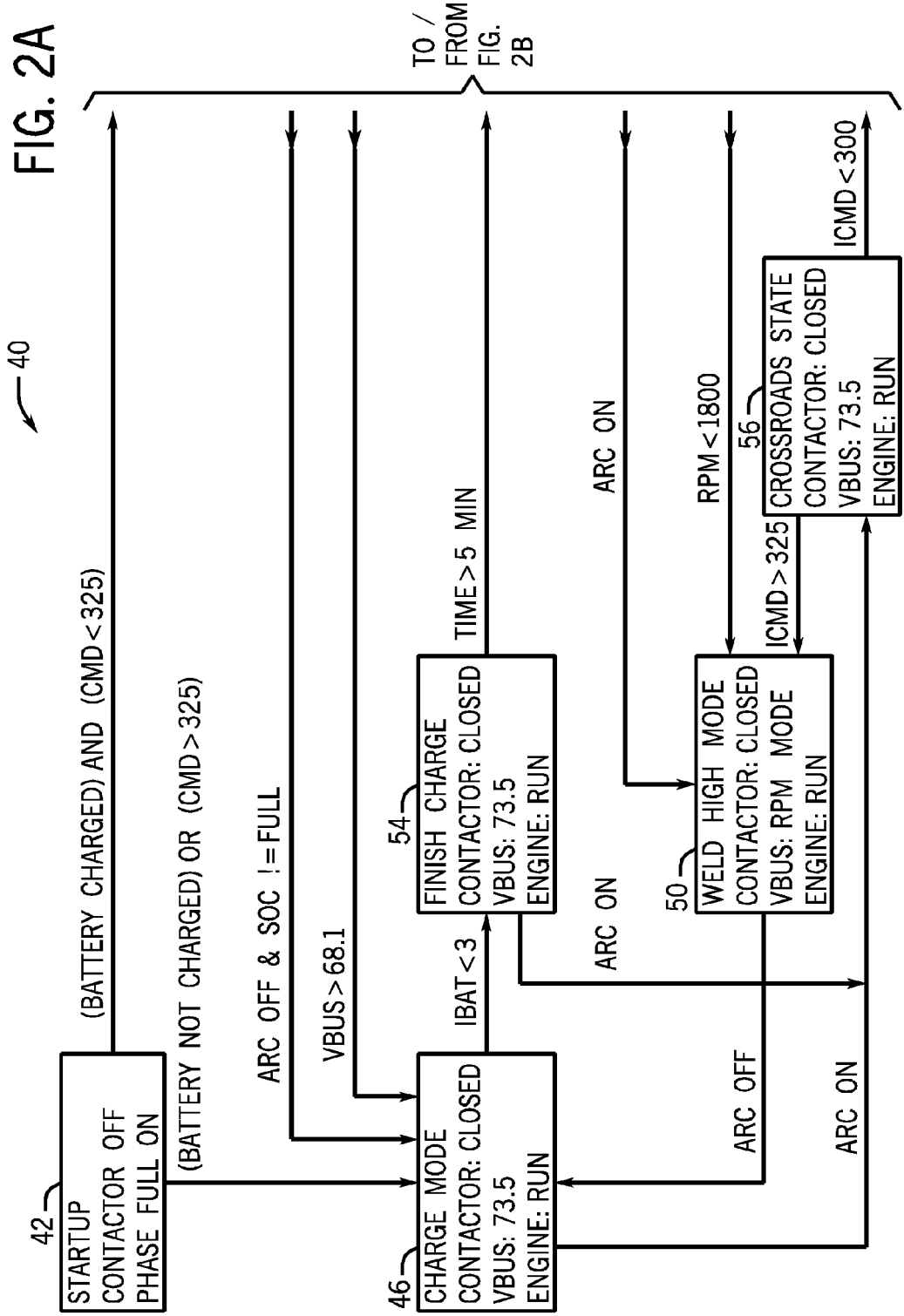

HYBRID WELDING CONTROL TECHNIQUE

BACKGROUND

The invention relates generally to welding systems, and, more particularly, to hybrid welding systems.

Welding is a process that has become increasingly ubiquitous in various industries and applications. As such, a variety of welding applications, such as construction and shipbuilding, may require welding devices that are portable and can easily be transported to a remote welding location. Accordingly, in some cases, it is often desirable for such welding devices to be operable as standalone units remote from a power grid or other primary power source. Therefore, a variety of welding systems utilizing alternate power sources, such as energy storage devices (e.g., batteries) and generators (e.g., engine-driven generators), have been developed. Furthermore, hybrid welding systems using both energy storage devices and generators have also been developed.

BRIEF DESCRIPTION

In one embodiment, a welding system includes a generator and an engine adapted to drive the generator to produce a first power output. The welding system further includes an energy storage device, such as a battery, configured to discharge energy to produce a second power output, and a charger coupled to the energy storage device and to the generator to receive power from the generator and charge the energy storage device. The welding system also includes a controller configured to control delivery of a weld power output from the welding system, the weld power output including power from at least one of the first power output or the second power output, wherein the controller in operation causes the weld output power to include power from the first power output but not the second power output when a commanded output is below a threshold and to include power from both the first power output and the second power output when the commanded output is above the threshold. Further, the welding system includes a contactor configured to enable the energy storage device to provide the second power output as part of the weld output power when the commanded output is above the threshold. In operation, the controller may command closing of the contactor to provide the second power output as part of the weld output power during weld operations and to enable the first power output to charge the energy storage device independent of the charger between weld operations.

In another embodiment, a welding system includes a generator, an engine configured to drive the generator, an energy storage device, and a charger configured to receive power from the generator and to charge the energy storage device. The welding system also includes an output bus configured to receive power from the generator and the energy storage device, and a contactor coupled between the energy storage device and the output bus such that the contactor routes power from the energy storage device to the output bus when the contactor is closed. Additionally, the welding system includes a rectifier coupled to the generator and a controller configured to control voltage of the output bus. The welding system, via the controller, is configured to maximize power from the generator and minimize power drawn from the battery during welding operations. And in an additional embodiment, a method of operating a welding system includes outputting weld power from an output bus of the welding system, and controlling the amount of power drawn from the battery to the output bus by regulating the voltage of the output bus.

DRAWINGS

These and other features, aspects, and advantages of the present invention will become better understood when the following detailed description is read with reference to the accompanying drawings in which like characters represent like parts throughout the drawings, wherein:

FIGS. 2A and 2B depict various operational states of a hybrid welding power supply and examples of conditions causing changes in the operational state of the hybrid welding power supply;

DETAILED DESCRIPTION

As described in detail below, embodiments of a hybrid welding system and methods of controlling such a system are provided. In one embodiment, the hybrid welding system may be adapted to provide output power via an engine-generator unit to meet smaller current load requirements (e.g., less than 325 amps) commanded by an operator, and to supplement the output power via an energy storage device to meet larger commanded current loads (e.g., above 325 amps). Although certain embodiments are described below in the context of a battery-based system, additional embodiments may include any of a variety of suitable energy storage devices, such as capacitors, fuel cells, or the like. Furthermore, embodiments of the disclosed hybrid welding systems may include engines with ratings below, for example, 25 horsepower or 30 horsepower, but may still be capable of producing output power to meet large load commands (e.g., above 325 amps) by combining output power from both one or more batteries and the engine-generator unit.

Figure 1:
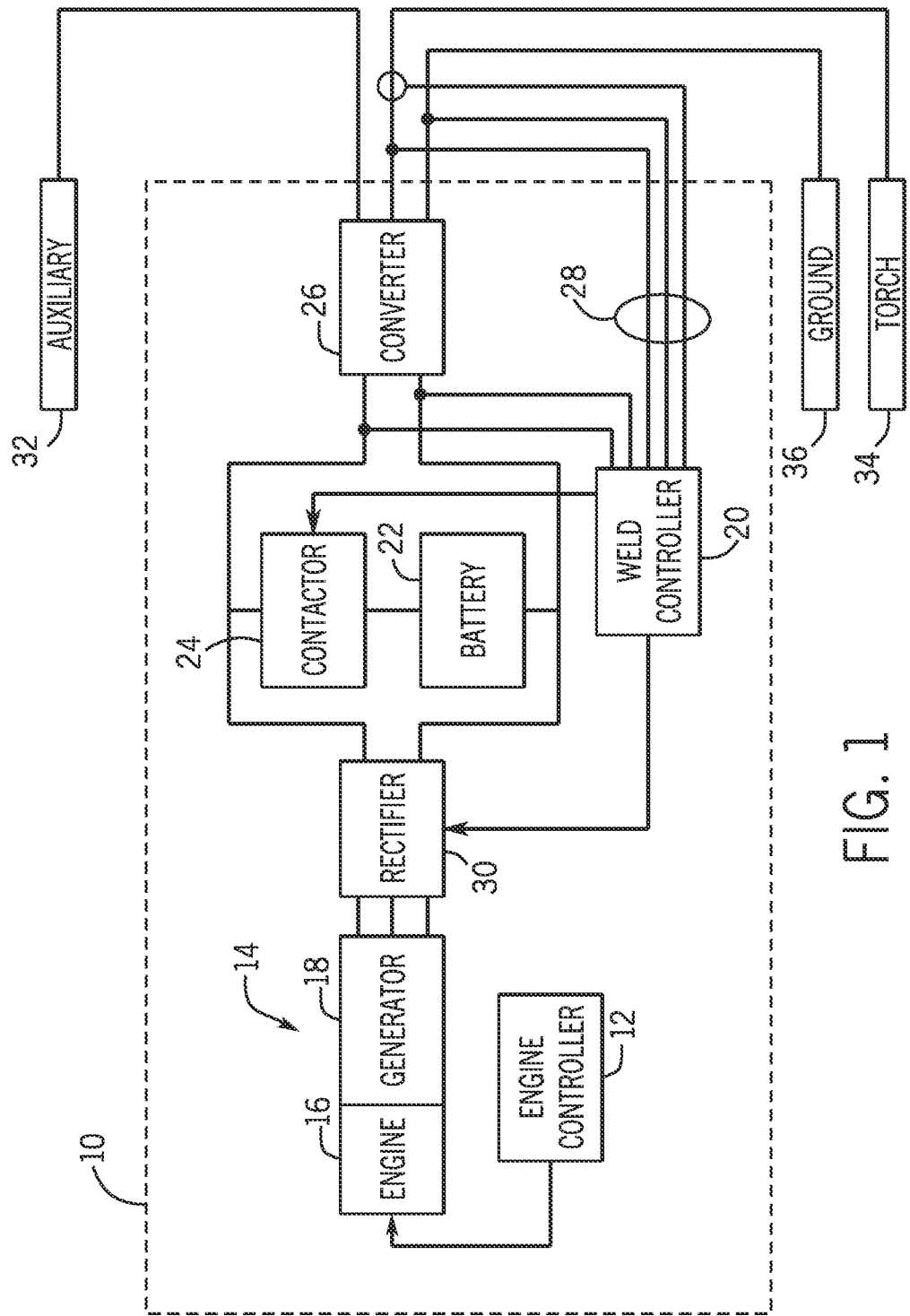
FIG. 1 is a block diagram illustrating components of a hybrid welding power supply in accordance with the present disclosure.

In the embodiment of FIG. 1, a hybrid power supply 10 is shown in the context of a welding system (e.g., a metal inert gas (MIG) welding system) including a welding torch. As used herein, the term "welding operation" refers to conventional welding processes (e.g., MIG welding) as well as cutting operations and gouging operations. Similarly, the term "weld power output" refers to a power output for a welding process, a cutting process or a gouging process. Indeed, embodiments of the disclosed hybrid welding systems may provide power in an incremental manner for a welding process, a cutting process, or any other suitable welding operation.

As depicted, the hybrid power supply 10 includes an engine controller 12, an engine-generator unit 14 including an engine 16 and a generator 18, a weld controller 20, a battery 22, a contactor 24, a converter 26, and a weld power converter 28 that produced output power for welding, feedback from the output to the weld power converter, and a rectifier 30. The hybrid power supply 10 also includes output terminals for coupling to an auxiliary output 32, a welding torch 34, and a ground 36.

In the illustrated embodiment, the engine-generator unit 14 and the battery 22 are each coupled to provide output power via the converter 26. However, in other configurations two or more converters may be employed to receive power from both the engine-generator unit 14 and the battery 22 and to convert such incoming power to one or more appropriate power outputs. Still further, the illustrated embodiment shows the engine-generator unit 14, the battery 22, and the power converter 26 housed in a single mechanical enclosure. In other embodiments, such components may be coupled together in mechanical enclosures in any of a variety of suitable ways. For example, in one embodiment, the engine-generator unit 14 may be coupled with the power converter 26 in one enclosure, and the battery 22 may be housed in another mechanical enclosure. In such an embodiment, the separate mechanical enclosures may be coupled via cabling through the welding environment.

During operation, the hybrid power supply 10 is configured to meet the commanded output levels of the welding operation in an incremental manner, as described in detail below. Such commanded output levels may be commanded based on one or more of amperage, voltage, wire type, wire feed speed, stick electrode diameter, and so forth. As such, the engine 16 is configured to drive the generator 18 to produce power, which may be utilized, for example, to provide power to the auxiliary output 32, to charge the battery 22, and to provide some or all of the power for a weld power output via the power converter 26. In some configurations a dedicated battery charger may be included to control a charging regime for the battery. Moreover, in some embodiments, the engine 16 may have a rating of below approximately 75 hp, below approximately 55 hp, below approximately 45 hp, below approximately 35 hp, below approximately 25 hp, below approximately 15 hp, or below approximately 5 hp. For example, for high power welding operations (e.g., cutting or gouging operations) the engine may have a rating of up to approximately 75 hp such that the engine is configured to meet the high power demands of the welding operation.

Further, the battery 22 (which may include one or more physical batteries connected in series, in parallel, or both) is configured to discharge to produce power, which may be routed to the welding torch 34 via contactor 24 and converter 26. In other embodiments, the battery 22 may discharge power that is also or instead routed to other torches (e.g., a cutting torch or a gouging torch) or as auxiliary power to other devices. And appropriate converters may be incorporated to condition the routed power in a desired manner for use by the devices. The engine controller 12 is configured to receive input (e.g., sensor feedback, manual inputs, etc.) for control of the engine and generator, while the weld controller 20 may receive inputs such as from the DC bus between the rectifier 30 and the converter 26, and output feedback 28, such as voltage and current feedback reflective of the output for the welding operation. For example, such an embodiment may be applicable in instances of low frequency, high peak power demands in which the engine-generator output is supplemented by the energy storage device output. In such embodiments, the energy storage device may be recharged during instances of lower power demands from either the engine-generator unit or from another power source when the engine-generator unit is OFF.

In one embodiment the weld controller 20 is configured to (i.e., includes appropriate programming, circuitry, or both that enables the controller to) control the rectifier 30, which may be a phase-controlled rectifier, thereby controlling the amount of power output from the generator 18 passing to the DC bus. In this embodiment, the power output from the generator 18 may be used to meet all of a commanded output level (e.g., the desired output as specified by an operator via a control on the welder) when the level is below an output threshold (e.g., 325 amps). When the commanded output level is above the output threshold, power output from the battery 22 may be used to supplement that from the generator 18.

Rather than directly regulating the power and current from both the battery 22 and the generator 18, the engine controller 12 may hold the generator speed at a generally constant level at a maximum speed (e.g., at least ninety percent of a maximum rated speed for the generator) to maximize power output from the generator 18 and minimize any power drawn from the battery 22. In some embodiments, the maximum rated generator speed is 1800 rpm or 1850 rpm. The weld controller 20 may close the contactor 24 when supplemental power is needed from the battery 22, such as in the event that the commanded output level exceeds the output threshold. The output threshold may be set at or near (e.g., at least ninety percent of) the maximum output capable of being provided by the generator 18 via the power converter circuitry 26. Because the generator 18 will often be providing maximal power whenever the battery 22 is used, power draw from the battery 22 is both minimized and equal to the supplemental amount needed to meet the commanded output level without regulating the power or current from the battery 22. The weld controller 20 may also monitor and regulate the voltage of the DC bus to control the amount of power drawn from the battery 22.

When the commanded output level can be met without power from the battery 22 (e.g., the commanded output level is below 325 amps), the contactor 24 may remain open and the charge of the battery 22 may be maintained. As noted above, although the battery 22 is depicted as a single power source in FIG. 1, it will be appreciated that the battery 22 may in fact be multiple batteries. For instance, in one embodiment, the hybrid power supply 10 includes five, six-cell batteries with a capacity of about 2.27 volts per cell (or about 68.1 volts for all of the batteries). The system trickle charge or float charge the battery or batteries, and a charger may be used to maintain a charge state of the batteries. When the battery 22 is not fully charged, or when the commanded output level exceeds the threshold, the contactor 24 may be closed and the full power of the generator 18 may be used to charge the battery 22, independent of battery charging, when not in a welding operation (e.g., when there is not an active arc between the torch 34 and a workpiece).

As generally described above, the weld controller 20 may be adapted to implement an incremental power access method to ensure that the commanded outputs of the welding operation are met in an efficient manner. Furthermore, such an incremental approach to control of the hybrid welding system may allow for the engine to be small, for example, rated for less than approximately 25 horsepower, while maintaining the ability to handle large loads (e.g., above approximately 325 amps).

Figure 2B:
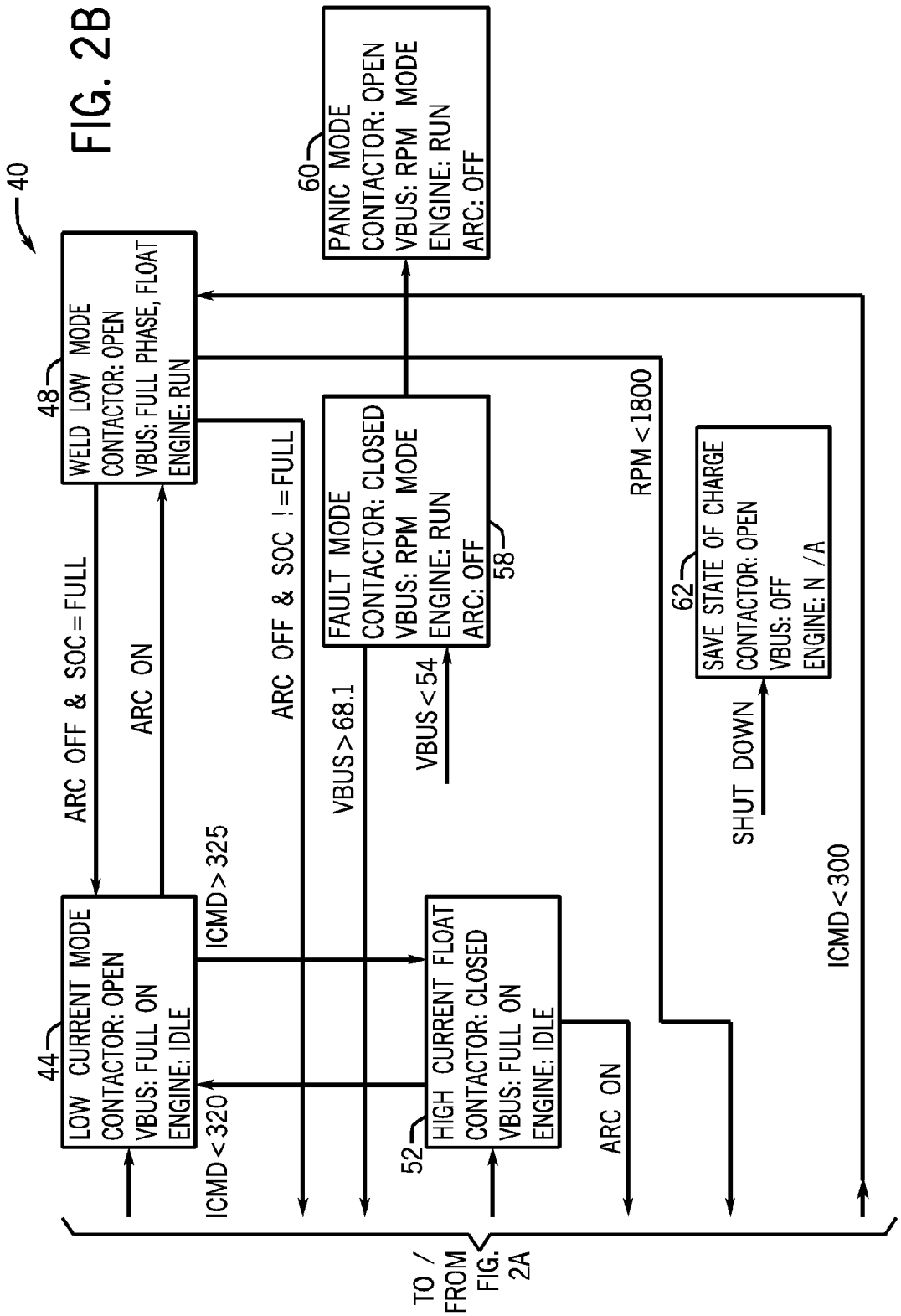

An example of operating states of the hybrid power source 10 is provided in the block diagram 40 of FIGS. 2A and 2B in accordance with one embodiment. The controller 20 may detect various conditions and cause the hybrid power source 10 to change between the various operating states. At startup of the hybrid power source 10 (block 42), the contactor 24 is off. Upon activation of the system, if the battery 22 is fully charged and a commanded output (a current output in the present example) is less than 325 amps, the hybrid power supply 10 enters a low current mode (block 44). Otherwise, the hybrid power supply 10 enters a charge mode (block 46). In the low current mode, the contactor 24 remains open, the DC bus is fully on, and the engine 16 is idle. With initiation of a welding arc, the hybrid power supply 10 moves from the low current mode to a weld low mode (block 48). In this mode, the contactor 24 remains open, the DC bus is in a full phase, float mode, and the engine 16 runs to provide power to the bus. When the arc turns off, the hybrid power supply 10 may return to the low current mode if the battery 22 remains full or may otherwise proceed to the charge mode (block 46). In the charge mode, the contactor 24 is closed to allow power from the generator 18 to charge the battery 22. Additionally, in the charge mode, the bus may be maintained at 73.5 volts and the engine 16 runs to produce power via the generator 18.

When the charging current to the battery falls below 3 amps while in the charge mode, the hybrid power supply 10 proceeds from the charge mode to a finish charge mode (block 54). Similar to the charge mode, in the finish charge mode the contactor 24 remains closed, the bus is maintained at 73.5 volts and the engine 16 continues to run. After 5 minutes in the finish charge mode, the hybrid power supply 10 enters a high current float mode (block 52) in which the contactor 24 remains closed, the bus is fully on, and the engine 16 idles. However, if a welding arc is initiated while the power supply 10 is in the charge mode or the finish charge mode, the hybrid power supply 10 instead proceeds to a crossroads state (block 56). From this crossroads state, if a commanded current exceeds 325 amps the hybrid power supply 10 will enter a weld high mode (block 50) in which the contactor 24 is closed, the bus operates in an RPM mode, and the engine 16 runs. If the commanded current is below 300 amps, the hybrid power source 10 will enter the weld low mode from the crossroads state. For other levels of commanded currents (i.e., 300 to 325 amps) while in the crossroads state, the contactor 24 remains closed, the bus is maintained at 73.5 volts and the engine 16 continues to run.

If the power supply 10 detects the voltage on the bus has fallen below a minimum threshold, such as 54 volts in FIG. 2B, the hybrid power supply 10 may enter a fault mode (block 58). In this fault mode, the contactor 24 is closed, the bus operates in the RPM mode, the engine 16 is run to produce power via the generator 18, and welding output is disabled. If the voltage on the bus then increases above 68.1 volts, the hybrid power supply 10 may return to the charge mode. Otherwise, the power supply may enter a panic mode (block 60), in which the contactor 24 is opened. Upon shut down, the hybrid power supply 10 may save its state of charge (block 62), open the contactor 24, turn off the bus, and deactivate the engine 16.

Figure 3:
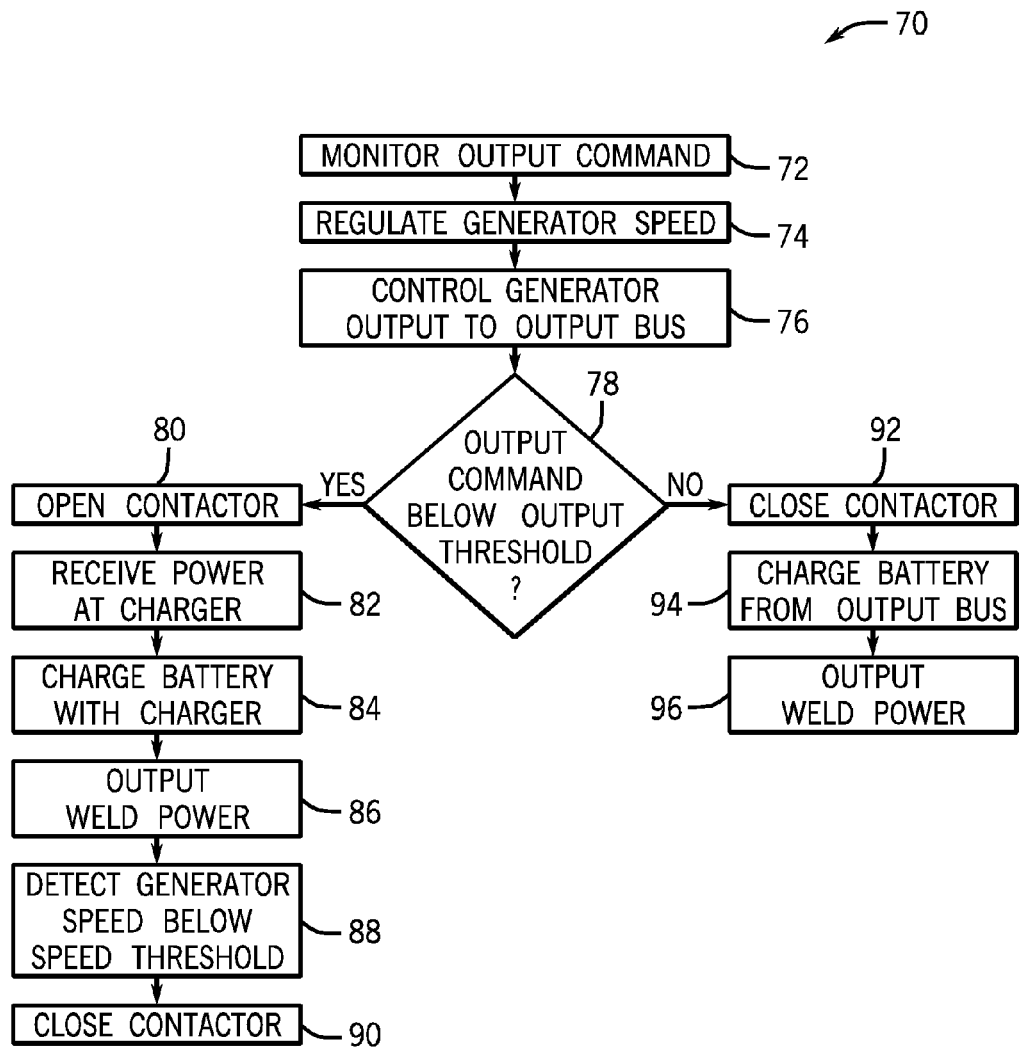
FIG. 3 is a flowchart representative of possible operation of a hybrid welding power supply.

Another example of operation of a hybrid power supply 10 is provided in FIG. 3 in accordance with one embodiment. Particularly, in the flowchart 70, the hybrid power supply 10 may monitor commanded output (i.e., a commanded output current) at block 72. The controller 12 may regulate the speed of the generator 18 at block 74, and may control the generator output to bus (e.g., via the rectifier 30) at block 76. If the commanded output level is below an output threshold (decision block 78), the hybrid power supply 10 may cause the contactor to be opened at block 80. Additionally, battery may receive power from the generator 18, such as via a charger (block 82) and to charge (or maintain the charge on) the battery 22 (block 84). The hybrid power supply 10 may output weld power at block 86. Also, the hybrid power supply 10 may detect that the generator speed has fallen below a speed threshold at block 88 and, in response, close the contactor 24 (block 90) to allow the battery 22 to provide power to the bus. If the output command is not below the output threshold (decision block 78), the power supply 10 may close the contactor 24 at block 92. Further, with the contactor 24 closed, the power supply 10 may charge the battery 22 directly from the bus (block 94). Also, the power supply 10 may provide output weld power (block 96), to the welding torch 24 (e.g., upon actuation of a trigger on the weld torch 34).

Figure 4:
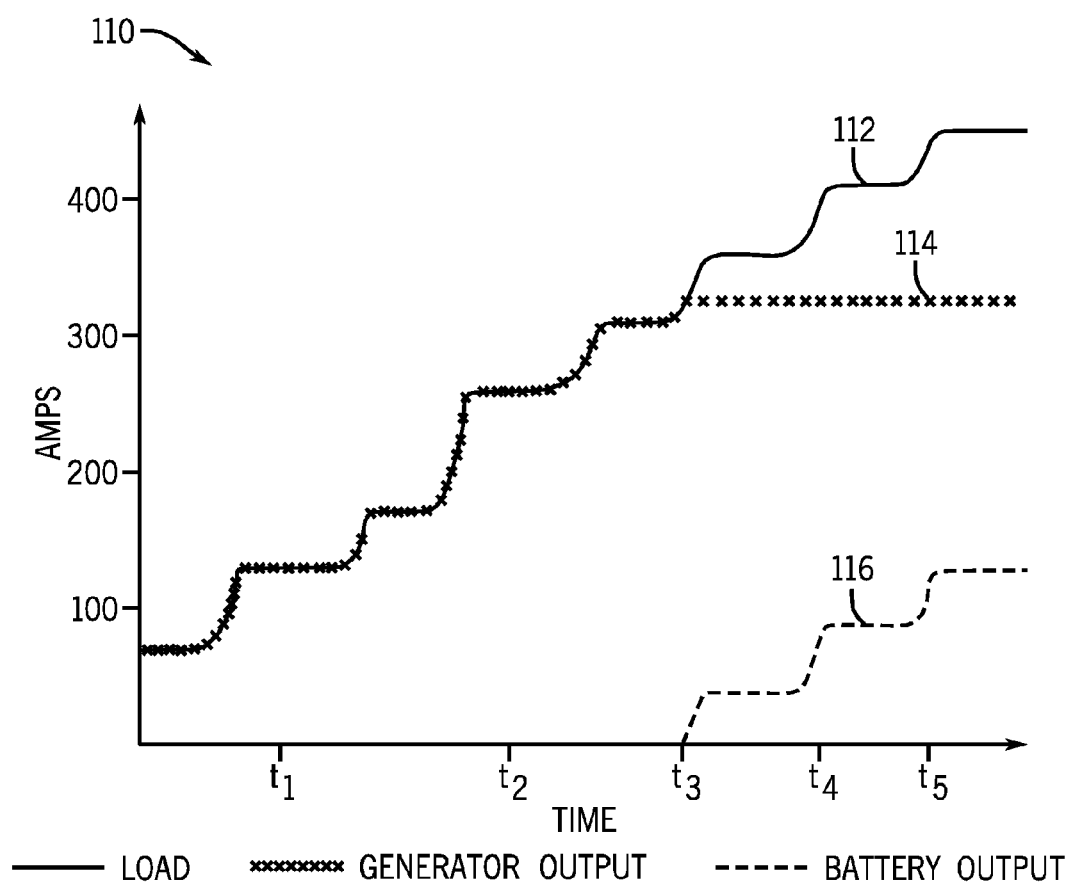
FIG. 4 is a graph illustrating examples of a commanded current for a load, a battery output, and a generator output during a hybrid welding operation in accordance with the present disclosure.

Operation of the hybrid power supply 10 may also be better understood with reference to FIG. 4, which is a graph 110 generally depicting how generator output and battery output may be used in one embodiment to meet a requested load. Particularly, curve 112 represents the commanded load, while the generator output and the battery output are represented by reference numerals 114 and 116, respectively. At time $t_1$, the commanded current is approximately 120 amps and is fully met by the generator output 114. Similarly, at time $t_2$ the commanded output is approximately 260 amps and is again met entirely by the generator output 114. At time $t_3$, the commanded load 112 is equal to a maximum level from the generator output 114. In the presently illustrated embodiment, the maximum generator output is 325 amps, though it will be appreciated that other embodiments may have different maximum generator outputs. As the commanded load 112 increases from $t_3$ to $t_4$, and again to $t_5$, maximum output from the generator 18 is provided and the battery output 116 increases to meet the portion of the load 112 unmet by the generator output 114. In this way, the generator output 114 is used to meet all commanded load 112 up to the maximum output of the generator (e.g., 325 amps), and the battery output 116 is only used to meet additional load 112 above the maximum output of the generator.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A welding system comprising:
a generator;
an engine configured to drive the generator to produce a first power output;
an energy storage device configured to discharge energy to produce a second power output;
a controller configured to control delivery of a weld power output from the welding system, the weld power output including power from at least one of the first power output or the second power output, wherein the controller in operation causes the weld output power to include power from the first power output but not the second power output when a commanded output is below a preset threshold and to include power from both the first power output and the second power output when the commanded output is above the preset threshold; and
a contactor controlled by the controller and configured to enable the energy storage device to provide the second power output as part of the weld power output when the commanded output is above the preset threshold, wherein the controller, in operation, receives feedback from the weld power output and commands, automatically and in a closed loop manner, opening or closing of the contactor to provide the second power output as part of the weld output power during weld operations based upon power needed for the welding operation and to enable the first power output to charge the energy storage device independent of a charge state of the energy storage device between weld operations, wherein the controller commands opening or closing of the contactor to enable or disable the energy storage device from providing the second power output based upon the preset threshold of a parameter of welding power.

2. The welding system of claim 1, comprising weld power converter circuitry configured to modify characteristics of the first power output such that, in operation, the weld power output includes the first power output as modified by the weld power converter circuitry.

3. The welding system of claim 2, wherein the preset threshold is a current threshold that is at least ninety percent of the maximum current the welding system is configured to output from the weld power converter circuitry.

4. The welding system of claim 3, wherein the current threshold is 325 amps.

5. The welding system of claim 1, wherein the energy storage device is a battery.

6. The welding system of claim 1, wherein the welding system is configured to float charge the energy storage device.

7. A welding system comprising:
a generator;
an engine configured to drive the generator;
an energy storage device;
an output bus configured to receive power from the generator and the energy storage device;
a contactor coupled between the energy storage device and the output bus such that the contactor routes power from the energy storage device to the output bus when the contactor is closed;
a rectifier coupled to the generator; and
a controller configured to receive feedback from output of the welding system and to control voltage of the output bus by commanding, automatically and in a closed loop manner, opening and closing of the contactor;
wherein the welding system, via the controller, is configured to maximize power from the generator and minimize power drawn from the energy storage device during welding operations by opening or closing the contactor to enable or disable the energy storage device from routing power to the output bus based on a preset threshold of a parameter of welding power.

8. The welding system of claim 7, wherein the controller is configured to control effective power output of the generator to the output bus by controlling the rectifier.

9. The welding system of claim 7, wherein the controller is configured to control closing of the contactor to allow the energy storage device to output power to the output bus.

10. The welding system of claim 7, wherein the rectifier is a phase-controlled rectifier.

11. The welding system of claim 7, comprising a welding torch coupled to the output bus such that the welding torch receives the power from the output bus.

12. A method of operating a welding system including a battery and a generator and configured to provide weld power via an output bus of the welding system, the output bus connected to enable the output bus to receive power from both the battery and the generator, the weld power in operation including power output from one or both of the battery and the generator, the method comprising:
outputting the weld power from the output bus of the welding system; and
receiving, via a controller, feedback based on the output of the welding system and controlling, via the controller, the amount of power drawn from the battery to the output bus by regulating the voltage of the output bus by, automatically and in a closed loop manner, controlling a contactor to enable or prevent the battery from applying a voltage to the output bus based on a preset threshold of a parameter of welding power.

13. The method of claim 12, comprising:
monitoring a magnitude of a current output command;
closing the contactor to enable the battery to apply voltage to the output bus when the magnitude of the current output command exceeds the preset threshold; and
opening the contactor to prevent the battery from applying voltage to the output bus when the magnitude of the current output command is below the preset threshold.

14. The method of claim 13, comprising charging the battery when the contactor is open.

15. The method of claim 14, comprising receiving power from the generator for charging.

16. The method of claim 13, comprising charging the battery with output power from the generator via the output bus when the contactor is closed.

17. The method of claim 12, comprising regulating a rotational speed of the generator.

18. The method of claim 17, comprising controlling a phase-controlled rectifier to control the amount of power provided from the generator to the output bus.

19. The method of claim 17, comprising detecting that the rotational speed has fallen below a speed threshold and, in response to the rotational speed falling below the speed threshold, closing a contactor to enable the battery to provide power to the output bus.

20. The method of claim 12, wherein the welding system does not command the amount of power to be drawn from the battery.

* * * * *